United States Patent [19]

Butz et al.

[11] Patent Number: 4,992,946
[45] Date of Patent: Feb. 12, 1991

[54] DATA LINK FOR GAS TURBINE ENGINE CONTROL

[75] Inventors: Mark G. Butz, Cincinnati; James A. Berg, Maineville, both of Ohio

[73] Assignee: General Electric Company, Cincinnati, Ohio

[21] Appl. No.: 208,720

[22] Filed: Jun. 20, 1988

[51] Int. Cl.[5] .......................... G01K 7/02; F02C 9/00
[52] U.S. Cl. ................................ 364/431.02; 364/550
[58] Field of Search ..................... 364/431.01, 431.02, 364/550, 551.01, 900; 340/973

[56] References Cited

U.S. PATENT DOCUMENTS

| | | | |
|---|---|---|---|
| 4,312,041 | 1/1982 | De Jonge | 364/431.02 |
| 4,525,783 | 6/1985 | Pischke et al. | 364/431.02 |
| 4,575,803 | 3/1986 | Moore | 364/551 |
| 4,604,711 | 8/1986 | Benn et al. | 364/900 |
| 4,621,335 | 11/1986 | Bluish et al. | 364/550 |
| 4,821,216 | 11/1989 | Howell et al. | 364/551.01 |

OTHER PUBLICATIONS

Arinc Specification 429-9, Sep. 30, 1985, describes the ARINC 429 Protocol which may be used by the present invention.

EIA Standard RS-232-C, describes the RS 232 Protocol which may be used by the present invention.

*Primary Examiner*—Felix D. Gruber
*Attorney, Agent, or Firm*—Jerome C. Squillaro; John R. Rafter

[57] ABSTRACT

The invention concerns an interface for a digital electronic control for a gas turbine engine. The interface allows one to gain access to random access memory in the control, wherein data of interest is stored. The data includes information about present operating conditions of the engine, such as component speeds and temperatures, as well as data concerning the health of components. The data is in digital format, but is converted into analog format within the control and transmitted from the control in analog format. The analog data is used to drive a recording device, such as a strip chart recorder, thus allowing information about the engine to be transmitted to a location remote from the engine, in real time.

18 Claims, 3 Drawing Sheets

DATA LINK FOR GAS TURBINE ENGINE CONTROL

The invention concerns a system for transmitting data from an electronic fuel control for a gas turbine engine to an external recording device.

BACKGROUND OF THE INVENTION

FIG. 1 illustrates a gas turbine engine. A digital electronic control, indicated by block 1, controls several actuators of the engine by means of signals delivered on lines 2A–D. These actuators include the following.

A first actuator 6A opens and closes a bleed door 9 which bleeds pressurized air 11 from booster stage 14. The booster 14 is a low-pressure compressor, and bleeding is required in order to match the output of the booster, at point 16, to the input requirements of the high-pressure compressor 18. Door 9 is commonly referred to as a variable by-pass valve (VBV).

A second actuator 6B operates variable stator vanes 26 (VSV's), which are shown in more detail in FIG. 2. Varying the angle A by rotation of the VSV's, indicated by circular arrows 22, allows one to control the direction of the airstream 24 which enters the compressor blades 27, thereby controlling the angle of attack of the compressor blades 27. VSV's are used to improve the performance of the compressor under acceleration.

A third actuator 6C in FIG. 1 controls a valve 30 which blows hot (or cold) air 33 upon turbine casing 36 in order to expand (or shrink) the casing 36 to thereby control the clearance 39 between turbine blades 41 and the casing 36. The air 33 is commonly bled from the high-pressure compressor 18. It is desirable to maintain as small a clearance 39 as possible in order to minimize leakage through the clearance. Leakage represents a loss because the leaking air imparts virtually no momentum to the turbine blades 41, and the energy in the leaking air is wasted.

A fourth actuator 6D in FIG. 1 controls a fuel valve 43 which controls the amount of fuel delivered to combustors 44.

In addition to these four types of actuator, other types are also in use in gas turbine aircraft engines. For example, there are actuators involved in the thrust reversing system, in exhaust nozzles which are variable in area, and in thrust vectoring systems used in vertical takeoff and landing (VTOL) aircraft.

As stated above, lines 2A–D deliver control signals to the actuators 6A–D, and the signals generally take the form of analog electrical signals, instead of digital signals of either the serial or parallel type. Consequently, a digital-to-analog conversion must take place at a location between the control 1 and the actuators 6A–D because the control 1 in FIG. 1 is of the digital type: the control contains a digital computer (not shown in FIG. 1), which processes and stores data in digital form. Digital-to-analog converters (D/A's) 60 in FIG. 3 accomplish this conversion, and are described later in more detail.

In addition to driving the actuators described above, the control 1 receives signals on lines 61 from sensors (not shown) on the engine which indicate engine operating conditions, such as temperatures, pressures, rotational speeds, and stator vane positions. The control uses these sensor signals to compute the signals to be sent to the actuators, and to compute other data for other purposes.

It is desirable, especially during ground-based testing of the engine, to monitor the signals produced by selected sensors, and, further, to perform the monitoring at a recording station 63 located remote from the engine. At present, two types of signal interface, indicated by line 65, are commonly used in this monitoring, and they carry digital signals between the control 1 and recording station 63. A first type uses the RS 232 protocol, and a second type uses the ARINC 429 protocol. Details concerning the ARINC 429 Protocol are found in Specification 429-9, dated September, 1985, and available from Aeronautical Radio Incorporated, located in Annapolis, Md. Details concerning the RS 232 Protocol are found in Electronic Industries Association Standard RS-232-C, dated August, 1969, and the Association is located in Washington, D.C. However, both protocols have limitations. For example, the ARINC protocol allows one to reach only about 100 random access memory (RAM) locations, and allows an update time (i.e., the shortest time allowed between consecutive readings of the data) in the range of 60 to 240 milliseconds (msec.)

In contrast, the RS232 protocol can read all RAM locations in the digital electronic control, but the update rate can be slower, about 125 to 250 msec. It is sometimes desirable to read all memory locations, and at a faster rate, than allowed by these two types of interface.

Further, with both protocols, the digital-to-analog conversion is done at the recording station 63, not in the control 1.

OBJECTS OF THE INVENTION

It is an object of the invention to provide an improved system for transmitting data from a digital electronic control for a gas turbine engine to external equipment.

It is a further object of the invention to provide a data link for an electronic control for a gas turbine engine which can read all memory available to the microprocessor within the control and which has a rapid update rate.

SUMMARY OF THE INVENTION

In one form of the invention, digital-to-analog convertors, which are contained in a digital electronic control of a gas turbine aircraft engine, are used to convert digital data into analog form and transmit the converted, analog data to a recording device located remote from the control. The invention allows one to gain access, from the remote location, to random access memory within the digital control, thus allowing one to monitor engine performance from the remote location.

DETAILED DESCRIPTION OF THE INVENTION

Figure 1:
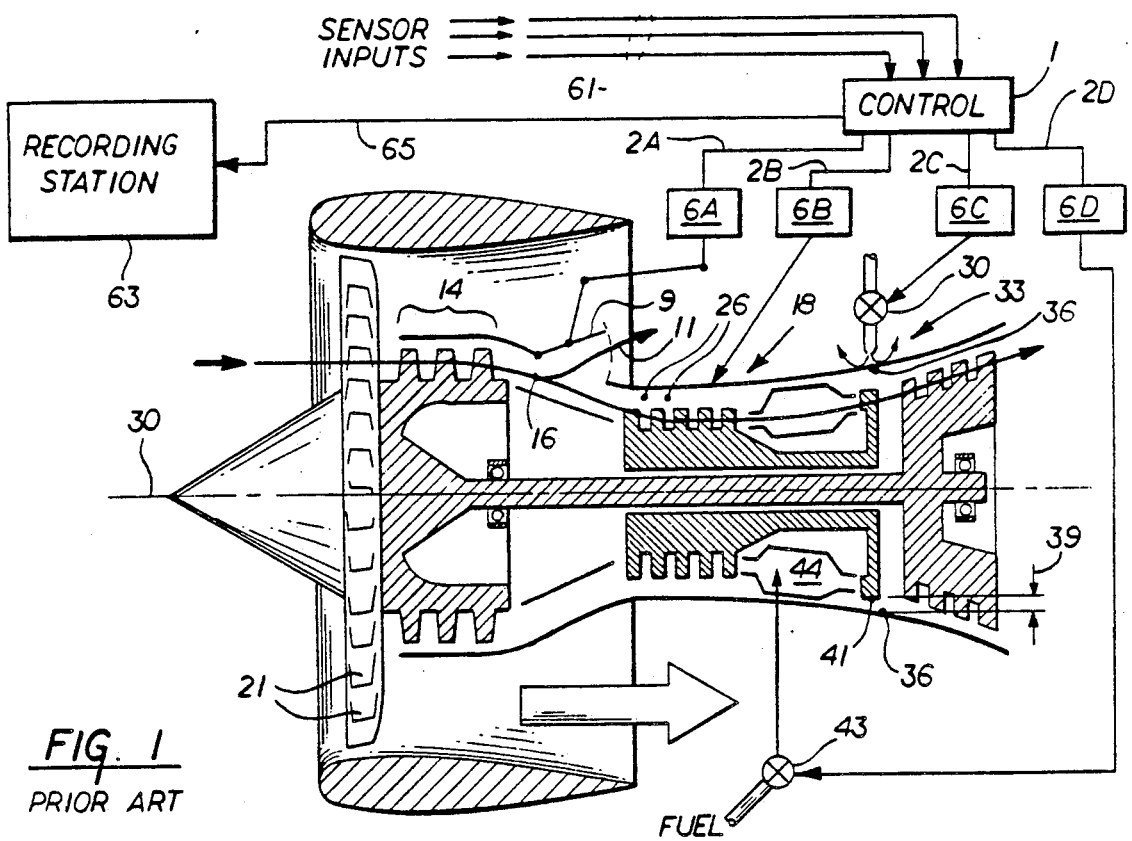
FIG. 1 illustrates a gas turbine engine in schematic cross-section.
Figure 2:
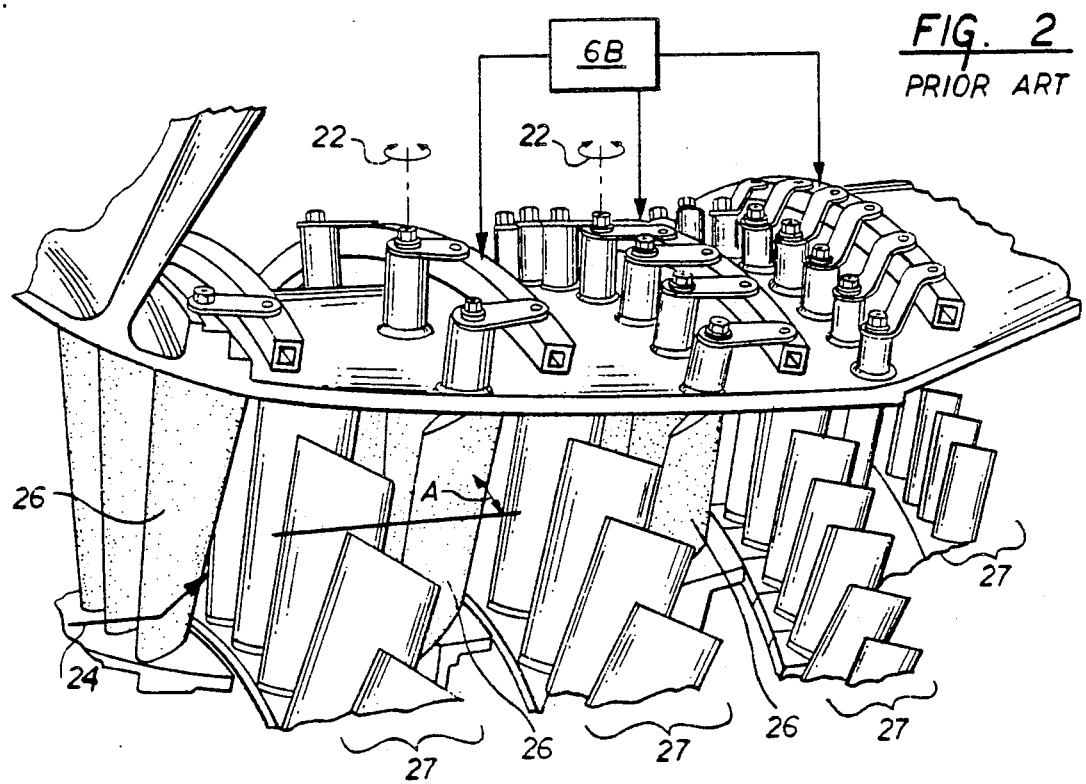
FIG. 2 illustrates variable stator vanes contained in the high-pressure compressor 18 of the engine in FIG. 1.
Figure 3:
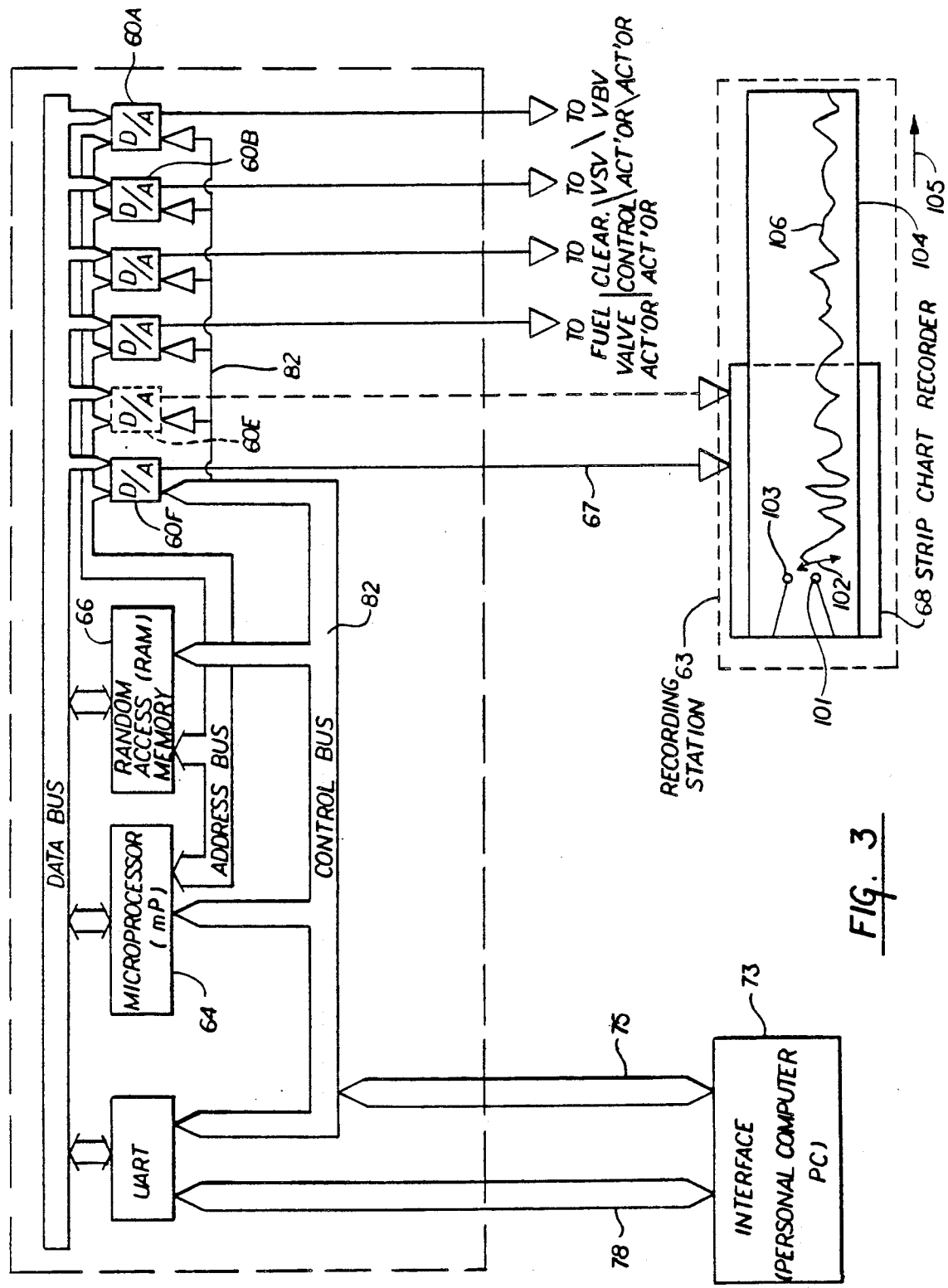
FIG. 3 illustrates part of the control 1 in FIG. 1, together with part of the present invention.

FIG. 3 illustrates part of the control 1 of FIG. 1, but in greater detail, and also shows apparatus used by the invention. The control 1 includes a microprocessor 64, Random Access Memory (RAM) 66, D/A's 60A-F, and signal busses as indicated. D/A's 60A-D are used to provide signals to actuators 6A-D in FIG. 1 as indicated in FIG. 3.

The microprocessor 64, which is designated mP herein, is preferably one of the MC 68000 series sold by Motorola Corporation, located in Austin, Tex. The D/A's are available from Analog Devices, located in Norwood, Mass., as model number AD 390.

In the invention, one or more D/A's, in addition to those (i.e., D/A's 6A-D) used to drive the actuators 6A-D, are used to feed analog signals on transmission line 67 to recording equipment located at the recording station 63. One type of recording equipment is a strip chart recorder 68 of model number 220, available from Gould, Incorporated, located in Cleveland, Ohio. A typical strip chart recorder has a moving pen 101 which moves, as indicated by arrow 102, in response to the signal on line 67, and which contacts a paper strip 104 which advances in the direction of arrow 105, thereby producing a printed record 106 as the paper advances.

An interface, in the form of a small computer 73, such as one sold by COMPAQ Computer Corporation, located in Houston, Tex., as model number 450-D, and designated PC herein, is connected by a linking bus 78 to a universal asynchronous receiver transmitter (UART), such as that available from Intel Corporation, located in Santa Clara, Calif., as model number 8251A. The UART takes the serial format RS-232 data, carried by bus 78, and buffers the data so that it can be transferred into RAM locations in block 66 for access by the microprocessor 64. The PC 73 is also connected to the control bus 82 of the microprocessor 64 by bus 75. In one mode of operation, the apparatus of FIG. 3 functions as follows.

The PC 73, using the control bus 82 and the UART, instructs the microprocessor 64 to execute an interrupt routine. The interrupt routine is a computer program which is written in advance and contained in RAM 66. The interrupt routine is illustrated in flow chart form in FIG. 4. The operator using the PC 73 calls up the interrupt routine by sending an interrupt signal to the microprocessor 64. In response, the interrupt routine requests that the PC supply five items of data, as indicated, and in the order indicated, beginning with "ADDD", which is the address in the RAM at which a data word of interest is located. (If the PC supplied data out of the expected order, the interrupt routine would not know this, and so could confuse, for example, MASK information, MMMM in FIG. 4, for SHIFT information, SHSH, both of which are discussed later.)

The interrupt routine uses handshaking signals in collecting the data. That is, at the start of data transmission, one of the lines in the control bus 82 in FIG. 3 indicates to the UART that the microprocessor 64 is ready to receive data. In response, the UART transmits data received from the PC, for example, the "ADDD" data, and then sends a handshake signal to the mP so indicating. Then, the mP sends another handshake signal requesting the next data, which is "MMMM" data, and so on.

The PC is programmed in advance as to the types and sequence of data which must be sent to the mP: that is, an operator does not type the data into the PC at the time of handshaking, because the interrupt routine is executed too rapidly. The PC program first makes an interrupt request, as stated above, and then transmits, with handshaking, the five items of information indicated in FIG. 4, which will now be explained.

"ADDD" refers to the RAM address from which a binary data word is to be retrieved by the mP 64. (Data words for the 68000 processor described above are 16 bits long. However, for ease of explanation, some exemplary data words used herein will be four bits long.) The word located at the address ADDD is not disturbed, but only read by the mP, because the word may be used by another program, not connected with the invention, in controlling the engine operation.

Two types of data word are used: the word may either indicate an engineering parameter, e.g., engine speed, or, alternately, act as a status word, wherein each bit represents the health of an engine signal. As an example of a status word, a four bit status word can contain information concerning as many as four components in the engine (one bit for each component), or concerning signals produced by the components. If the third most significant bit (MSB) in a status word refers to the health of a particular temperature sensor, then, when the word reads 0000, the word indicates that the sensor is functioning properly (i.e., is healthy), while if the word reads 0010, the sensor is considered to be malfunctioning.

"MMMM" refers to a mask value which is used to isolate a selected bit of the binary data word located at the memory address ADDD. For example, the data word at the memory address may be the binary number 0010. The value of the third MSB (which is underlined) may be sought.

The value of the third MSB is ascertained by a masking operation in which the word (0010) is logically ANDed with a word consisting entirely of zeros, with the exception of a "1" at MSB three, which is the bit of interest. That is, the masking operation, in more general terms, is (ABCD) AND (0010). If the result of the AND operation is 1, then the value of bit C is 1. Conversely, if the result of the AND operation is 0, the value of bit C is 0.

Different masks are used for engineering parameter words than for status words. Generally, the mask value used for an engineering parameter (such as engine speed) consists entirely of ones (e.g., 1111). The logical ANDing of this mask with the engineering parameter word will result in no change to the word. However, for status words, the mask operation is used to study individual bits contained within the word. One reason for performing masking of status words is the following.

"Sensor validation" routines exist in a larger program, called the Engine Control Program (ECP), which controls the engine and which is located in the control 1 of FIG. 1. The sensor validation routines examine the health of the sensors which provide the signals on lines 61 in FIG. 1. If a sensor validation routine detects that a given sensor may be faulty, the routine identifies the faulty sensor by changing a specific bit (such as MSB 3 in the example above) in the status word at a specific memory location.

As indicated above, five items of data are needed by the microprocessor in order to cause a D/A to generate a proper analog output voltage. The first item, ADDD, is the address at which a data word of interest is located. (As stated above, data words for the MC68000 are 16 bits long. However, again, the following discussion will use four bit words for simplicity.) The other four items (mask: MMM; scale: SCSC; shift: SHSH; and bias: BBBB) are used by the microprocessor to format (or rearrange) the 16 bit word so that the analog voltage produced by D/A will be calibrated in terms selected by the operator. The calibration achieved using the latter four items will be explained using two examples, one for a status word and one for an engineering parameter word.

As stated above, there are two different types of data that can be stored in the RAM address ADDD. The 16 bit word can represent either status information (such as the health status up to 16 different engine components) or an engineering parameter (such as engine speed). Each data type will require different values of MMM, SCSC, SHSH, and BBBB.

In the case of a status word, the operator must select one of the 16 bits for the D/A output. The selected bit becomes a "status bit." Further, he must determine the calibrated voltage to be produced by the D/A when the status bit is set to "1". For example, the data word at the address ADDD may be the binary number 1010. The operator determines that the bit of interest is LSB 2, which is the status bit and is underlined. The mask value, MMMM, is thus 0010. The microprocessor logically AND's the data word (1010) with the mask value (0010) to obtain a new binary word which will represent only the value of the LSB 2. In this example, the logical AND gives a result of 0010, while, if the status word were 0000, the logical AND would give a result of 0000. The result of the AND operation gives the value of the status bit.

The scale item, SCSC, is set to unity (i.e., 0001) for status words. The scale item is used primarily with engineering parameter words, as will be described in greater detail below. However, in the case of status words, when the status word is multiplied by the scale item of unity, the bit of interest retains its LSB position. For example, 0010 multiplied by 0001 equals 00000010. The bit of interest remains at LSB position 2.

The shift item, SHSH, is used in order to derive a 12 bit word from the 32 bit word produced by the scaling operation described in the preceding paragraph. (The reader is reminded that the microprocessor operates upon 16 bit words, and the multiplication of two 16 bit words produces the 32 bit word just mentioned.) The shift item, SHSH, is used to locate the status bit between LSB 26-30, inclusive. (For status words, only five of the twelve bits are used, namely, these LSB bits 26-30 inclusive. For engineering parameter words, all twelve bits will be used, as later explained.) The selection of these particular LSB positions 26-30 from the 32 positions can be explained with reference to the following table.

TABLE

| | |
|---|---|
| 000000000000 | = +10.000 Vdc |
| 000010000000 | = +9.375 Vdc |
| 000100000000 | = +8.750 Vdc |
| 001000000000 | = +7.500 Vdc |
| 010000000000 | = +5.000 Vdc |
| 100000000000 | = 0.000 Vdc |

The Table indicates dc voltages produced by the D/A's in FIG. 3 in response to selected 12 bit inputs. For example, an input of 000010000000 produces an output of +9.375 volts dc.

(In general, the output of a D/A is related to the input by the following equation:

$$Vdc = 10.0 - [(12 \text{ bit converted to decimal})/4096] \times 20.$$

The Table illustrates six particular solutions to the equation.)

For reasons which need not be understood here, the microprocessor selects the consecutive group between LSB 19 and LSB 30 as the 12 bit number, and sends the selected 12 bit group to the D/A. This group contains the LSB's 26-30. An example will illustrate computation of the SHSH's.

First, the operator identifies the LSB position of the bit in question. In the example above, the LSB was 2. Then, the operator decides which of the five output voltages in Table 1 should be produced by the D/A when the status bit is set equal to one, which causes the output of the logical ANDing in the masking operation to be unity. Finally, the operator chooses a shift value, SHSH, which tells the microprocessor how many positions to the left the bit should be moved in the 32-bit word so that the 12 bit word occupying LSB's 19-30 inclusive is the proper word according to the Table for the voltage desired.

For example, if a 7.5 volt signal is desired, then the status bit should occupy the LSB position 10 in the 12 bit word, as line 4 in the Table indicates. However, the 10 LSB position in the 12 bit word is actually the 30 LSB position in the 32 bit word, because the right most 18 bits of the 32 bit word have been dropped; only bits 19-30 are used. Restated, LSB 1 in the 12 bit word is actually LSB 19 in the 32 bit word; LSB 2 in the 12 bit word is LSB 20 in the 32 bit word, and so on. Consequently, the shift value, SHSH, is chosen to move the status bit from position 2 in the 32 bit word to position 28 in the same 32 bit word. A value of 26 (i.e., 28−2) is used for SHSH in this 7.5 volt example.

Similarly, in order to provide a D/A output voltage of 9.375 volts, the status bit would be moved from LSB position 2 in the 32 bit word to LSB position 26, using an SHSH value of 24 (i.e., 26−2).

The bias value, BBBB, has no meaning for status words, and so the bias value is set to 0 for status bit processing. The bias value for engineering parameters will be explained later.

Figure 4:
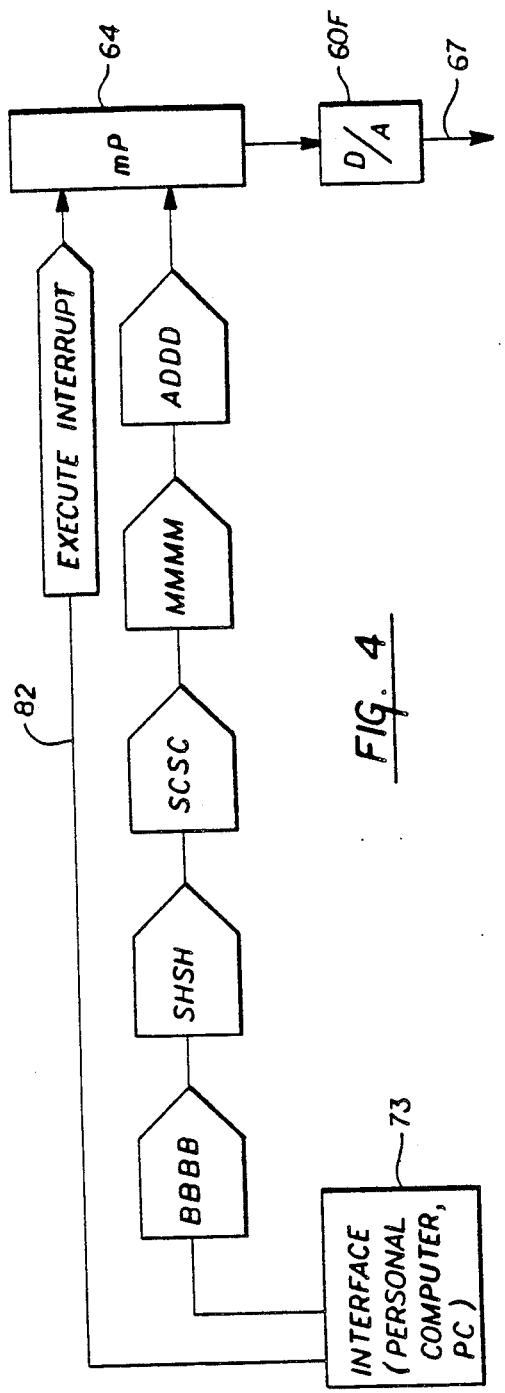
FIG. 4 illustrates a sequence of data transfers used in the present invention.

The preceding discussion has considered the five items of FIG. 4 in the context of processing of a status word. Now the discussion will consider an example illustrating the same five values in the processing of an engineering parameter.

The data word at memory address ADDD may represent engine inlet temperature (e.g., the temperature at point 31 in FIG. 1.) Since the value of the entire word is of interest, there is no need to isolate one bit of the word, and so that mask value, MMMM, is set to 1111. When MMMM is ANDed with the word at address ADDD, the result is a new binary word that is the same as the word at address ADDD.

The scale item, SCSC, is used for reasons which the following example will explain.

Both the scale item, SCSC, and the shift item, SHSH, are fed to the microprocessor 64 in order to accommodate the difference in bit lengths of the words contained in RAM, as compared with the length of the words fed to the D/A's: the RAM words are 16 bits long, while the D/A's accept only 12 bit words. For example, if a given RAM address, ADDD, contains a word indicating temperature, and, further, the temperature ranges between 0° and 300° F., one may consider that each degree is allocated a value of 218.45, which is 65,535/300, the numerator representing $2^{16}$ minus 1. That is, since each RAM address contains a 16 bit word, the word can represent a decimal number ranging from 0 to 65,535. A temperature of 1 degree would be indicated by a binary number equivalent to 218.45; a temperature of 2 degrees would be indicated by a binary number corresponding to 218.45×2; and so on.

In order to scale the 16 bit number to a corresponding 12 bit number, one solves the following equation:

$$x/65,535 = y/4096$$

wherein x is the decimal value of the temperature stored at RAM address ADDD, and y is the scaled temperature value fed to the D/A. An example will illustrate the computation.

Assume that the decimal value of the temperature at the address in question is 250 degrees. Substituting 250 for x in the equation above yields a solution for y of 15.625. The binary equivalent of this number 15.625 is fed to the D/A.

The values of SCSC and SHSH indicated in FIG. 4 depend upon the particular software implementation used in scaling the 16 bit word to a 12 bit word, and these variables contain information as to the maximum range (300 degrees in the example above) over which the variable of interest travels.

The bias value, BBBB, for an engineering parameter is set to 0 if the range of the parameter is unipolar (that is, the parameter is either always positive or always negative), or to the binary number $2^{15}$ if the range is bipolar (that is, having both positive and negative values). In response to the bias signal, the microprocessor causes the D/A to produce a negative voltage if required. For example, the variable at the RAM address ADDD may represent a temperature ranging from −300° F. to +300° F., so that a D/A output of +10 volts would correspond to a temperature of +300°, while a D/A output of negative 10 volts would correspond to a temperature of negative 300°.

After the mP receives the five pieces of data indicated in FIG. 4, the mP in FIG. 3 executes the computation requested (i.e., it executes the READOUT ROUTINE) and transmits the computed data to a D/A by using the data bus. An enabling signal, on the control bus 82, as known in the art, allows the D/A to receive the data, to the exclusion of D/A's which do not receive an enabling signal.

The output of the D/A, which is an analog voltage signal, is transmitted to a recording device, such as a strip chart recorder 68 in FIG. 3, as stated above. The frequency of transmission by a D/A depends upon the frequency of occurrence of the interrupt routine called by the EXECUTE INTERRUPT signal in FIG. 4. This frequency is, in turn, determined by the minor frame time of the Engine Control Program, ECP.

The minor frame time refers to the frequency of complete runs of the ECP. The ECP runs once every 0.015 seconds, although each run may not require the entire period of 0.015 seconds, and the minor frame time of the ECP has this value of 0.015 seconds.

In one form of the invention, the EXECUTE INTERRUPT signal in FIG. 4 causes the computation on the word located at ADDD to occur once every 0.015 seconds. This frequency of 0.015 seconds causes the data sent to a D/A to be sufficiently up-to-date (i.e., no older than about 0.015 seconds) as to be considered real time data. That is, the lag between, for example, (a) loading (by the ECP) a data word into RAM in FIG. 3 based on a sensor input on line 61 and (b) sending the word to a D/A after processing by the READOUT routine is about 0.015 seconds, making the D/A output substantially real time with respect to sensor outputs.

The preceding discussion has described an invention in which data in RAM of a digital controller 1 in FIG. 1 is processed by a microprocessor according to a READOUT program and sent to a D/A which transmits the processed data word, in analog form, to a location remote from the controller. One application for the invention is to detect the engine speed at which some sensors, which are vibration-sensitive, tend to fail.

In this application, two D/A's are used, the second being indicated by phantom D/A 60E in FIG. 3. Further, two READOUT ROUTINES are used, both identical in program structure, which is shown in FIG. 4, but each processing data retrieved from a different RAM address. Further, the MASK, SHIFT, etc. instructions will, in general, be different for each RAM address.

One RAM address, ADDD(1), contains the word which indicates engine speed, called the Speed Word. The other RAM address, ADDD(2), contains a word having a Maintenance Bit for a temperature sensor which appears to be speed-sensitive. That is, the temperature sensor appears to fail at a specific engine speed, perhaps because of a particular vibrational frequency experienced at that speed.

In order to detect the speed at which the failure occurs, the Speed Word is sent to one D/A, while the Maintenance Bit, after proper MASKing, etc., is sent to the other D/A. Each D/A drives a separate pen 101 and 103 of the strip chart recorder 68.

The engine is accelerated, and the Speed Word continually increases, in increments of one bit. The incremental increase explains the step-like appearance of the plot of the strip chart recorder, which appears in FIG. 5. Each step 150 indicates a one-bit increase in the input signal to the D/A which drives the pen driven by the D/A receiving the Speed Word.

Figure 5:
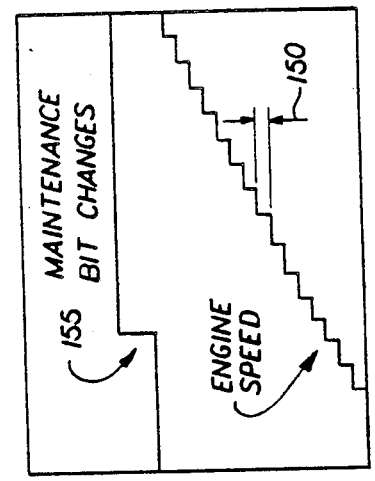

However, the Maintenance Bit, and the pen driven by this bit (the Maintenance Bit Pen, or MB Pen) is stable until the Maintenance Bit changes in value. The change causes a swing in the MB Pen. (The amount of the swing will depend upon the shift value SHSH used for this bit.) Thus, as shown in FIG. 5, the engine speed at which a sensor failure occurs is given by excursion 155 of the MB Pen.

A second application of the invention is used to check operation of engine components during start-up. During start-up, it is important that proper engine components activate in the proper order. For example, first, when the engine is non-rotating, a starter air valve (not shown) opens, delivering a blast of compressed air to the high pressure turbine blades 41 in FIG. 1 in order to spin the turbine. Then, when the turbine reaches the proper speed, the fuel valve 43 opens, delivering fuel to the combustors 44. After that, an igniter (not shown) activates, igniting the fuel. Following this, a flame detector (not shown) produces a signal indicating whether ignition has occurred.

If ignition fails to occur, this fact must be ascertained so that the fuel valve 43 can be closed, thus preventing unburned fuel from flooding the engine.

The invention can be used to check for proper sequencing as follows. Two D/A's are used, one receiving a Speed Word, as in the previous example, and the other receiving a composite signal indicating the occurrence of the four events.

One way to derive this composite signal is to combine the status bits which represent each event into one composite status word which can be sent to the D/A output. This can be performed using the invention in the following way. Initially, each bit of interest is manipulated by the microprocessor as described in the steps above. The bit which represents the first event is put into position MSB 2 of its binary data word using the proper values for ADDD, MMMM, SCSC, SHSH, and BBBB. The bit which represents the second event is put in position MSB 3 of its binary data word, the bit for the third event is put in MSB position 4 of its word and the bit representing the fourth event is put into position 5 of its word. Then these four binary data words are logically ORed together to create a composite binary data word. It is this composite word that is sent to the D/A.

In this case, the activation of starter air causes a signal of 01000 to occur in the starter air word. The start of fuel flow creates a signal of 00100 in the fuel flow word. Igniter operation creates a signal of 00010 in the igniter word. When flame is detected, a signal of 00001 occurs in the flame word. When these four words are logically ORed together, the result will depend upon which events have, in fact, occurred, as will now be explained.

If starter air is on, but the following are off: fuel flow, igniter, and flame detector, then the result of the logical OR operation would be 01000. (That is, 01000=01000 OR 00000 OR 00000 OR 00000.) This signal, when fed to the D/A (in the form of the 5 MSB's of the 12 bit word which is fed to the D/A), will cause a +5 VDC signal to be produced by the D/A, as indicated by the equation above. (That is, $5=10-(1024\times 20)/4096$.)

However, if both the starter air and fuel flow are on but both the igniter and flame detector are off, then the result of the logical OR operation would be 01100, and the analog voltage produced by the D/A would be +2.5 VDC. If the starter air, fuel flow and igniter are all on, but no flame is detected, then the result of the OR operation would be 01110, and the analog voltage produced would be +1.25 volts. Finally, if all four events occurred, then the result of the OR operation would be 01111, and the analog voltage would be +0.625 VDC.

Therefore, when the sequence of operation is proper, the sequence of signals reaching the D/A is 01000, 01100, 01110, and 01111, which correspond to +5, +2.5, +1.25, and +0.625 VDC, respectively. The sequence gives a time history of the four events. The pen driven by the D/A receiving these voltage signals will give the stair-step response 165 shown in FIG. 6.

Figure 6:
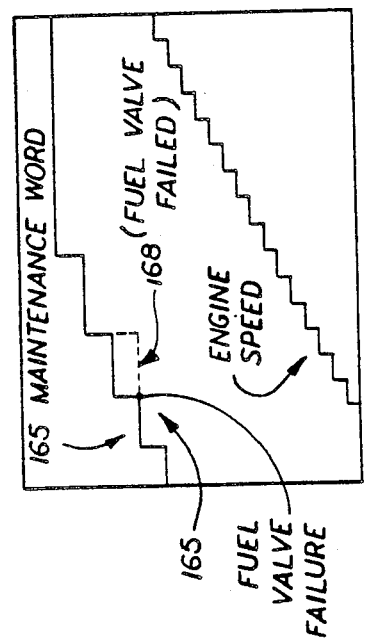
FIGS. 5 and 6 illustrate plots of a strip chart recorder which the present invention can provide. The plots show the engine speeds at which selected events concerning engine operation occur.

However, if the fuel valve should fail, then the sequence of signals reaching the D/A is 01000, 01000 (i.e., unchanged), 01110, and 01111, which correspond to +5, +5 (unchanged), +1.25, and +0.625 VDC respectively, and so the plot would be the phantom plot 168 shown in FIG. 6. A malfunction is apparent from the deviation from the stair-step plot 165, beginning at point 170. Further, the speed at which the malfunction occurred is apparent from the speed plot, and is the speed at which the deviation in the stair-step plot 165 occurs.

One significant feature of the invention lies in the fact that it can use hardware contained on the engine control 1 in FIG. 1 which would otherwise remain idle. That is, the D/A's 60 in FIG. 3 frequently are packaged as integrated circuits, and come in pairs or in fours (i.e., four D/A's constructed into one package in the latter case). Sometimes all of the D/A's in a package are not needed in order to operate the engine properly, and so excess D/A's exist in the control. For example, D/A 60F in FIG. 3 may be contained in the same package as D/A 60A, yet D/A 60F is not used to control an actuator. The invention utilizes these idle D/A's in order to drive the recording equipment at recording station 63 in FIG. 3.

Numerous substitutions and modifications can be undertaken without departing from the true spirit and scope of the invention as defined in the following claims.

We claim:
1. In a digital electronic control for a gas turbine engine, which controls fuel metering to the engine, and which includes a microprocessor, memory, and digital-to-analog convertors (D/A's), the improvement comprising:
  (a) interface means, located remote from the control, for instructing the microprocessor to transmit data to a D/A, the interface means being removable from the control without disrupting engine operation; and
  (b) display means, located remote from the control, for receiving output signals from the D/A.

2. Apparatus according to claim 1 in which the display means comprises a recording means for recording the data which is displayed.

3. In a digital electronic control, having a microprocessor, for a gas turbine engine, and which meters fuel delivery to the engine, the improvement comprising:
  (a) a first group of digital-to-analog convertors (D/A's) for
    (i) receiving digital signals from the microprocessor,
    (ii) converting the digital signals to analog signals, and
    (iii) sending analog signals to actuators which actuate engine components; and
  (b) a second group of one or more D/A's for
    (i) receiving digital signals from the microprocessor,
    (ii) converting the digital signals to analog signals, and
    (iii) sending analog signals to a recording system located external to the engine, the recording system being removable from the D/A's without disrupting engine operation.

4. An electronic control for a gas turbine engine, which controls fuel delivery to the engine, comprising:
  (a) a processor;
  (b) memory for storing digital words;
  (c) a digital data bus for carrying digital words between the memory and the processor;
  (d) at least one digital-to-analog (D/A) converter which can receive input from the digital data bus;
  (e) a recording device located remote from the control, the recording device being removable from the control without disrupting engine operation; and (f) a line for carrying analog signals to the recording device from the D/A.

5. In a digital electronic control for a gas turbine engine, which controls fuel delivery to the engine, the improvement comprising:
   (a) a processor for
      (i) receiving information, from a source external to the control, as to memory addresses of data and, for each address, types of computational processing for the data therein, the source being removable from the control without disrupting engine operation; and
      (ii) sending the data, after the processing, to a digital data bus; and
   (b) one or more digital-to-analog signal convertors for
      (i) receiving processed data from the bus;
      (ii) converting the processed data to analog form; and
      (iii) sending the data in analog form to a recording device external to the engine.

6. In a digital electronic control for a gas turbine engine, the improvement comprising:
   (a) a processor for
      (i) receiving information as to
         (A) memory addresses of data and,
         (B) for each address, types of computational processing to be performed on the data located there,
      the information being sent by a computer located external to the engine, which comprises means for performing one or more of the following procedures:
         (A) masking the data,
         (B) shifting the data,
         (C) scaling the data, and
         (D) biasing the data; and
      (ii) sending the data, after the processing, to a digital data bus; and
   (b) one or more digital-to-analog signal convertors for
      (i) receiving processed data from the bus;
      (ii) converting the processed data to analog form; and
      (iii) sending the data in analog form to a recording device external to the engine.

7. In a gas turbine engine, a method of obtaining printed data from a digital electronic engine control, which controls fuel delivery to the engine, and which includes a microprocessor, a random access memory (RAM), and digital-to-analog convertors (D/A's), all linked by a common digital data bus, comprising the following steps:
   (a) using one of the D/A's, transmitting an analog signal derived from data at a RAM address to a location remote from the control; and
   (b) recording the analog signal during transmission on a recording device which is removable from the control without disrupting operation of the engine.

8. In a digital electronic control for a gas turbine engine which controls fuel delivery to the engine, and which includes digital-to-analog convertors (D/A's), the method comprising the steps of:
   (a) transmitting digital data to a D/A for conversion to analog form; and
   (b) transmitting the data in analog form to a recording device outside the engine, the recording device being removable from the control without disrupting operation of the engine.

9. A method according to claim 8 and further comprising the steps of storing the digital data in memory prior to transmission to a D/A, and updating the stored digital data more often that once every 0.015 seconds.

10. In a digital electronic control for a gas turbine engine which controls fuel delivery to the engine, and includes digital-to-analog convertors (D/A's) which are contained in integrated circuit packages, each package of which contains two or more D/A's, the method comprising the steps of:
    (a) transmitting digital data to a D/A for conversion to analog form; and
    (b) transmitting the data in analog form to a recording device outside the engine, the recording device being removable from the control without disrupting operation of the engine.

11. In a gas turbine engine, a method of obtaining printed data from a digital electronic engine control, which controls fuel deliver to the engine, and which includes a microprocessor, random access memory (RAM), and digital-to-analog convertors (D/A's), all linked by a common digital data bus, comprising the following steps:
    (a) using a first D/A, providing a first analog signal based on a first digital word in RAM to a first line;
    (b) using a second D/A, providing a second analog signal based on a second digital word in RAM to a second line;
    (c) displaying, remote from the control, a visual indication of the first analog signal substantially at the same time as it occurs; and
    (d) displaying, remote from the control, indications when a change occurs in the second analog signal.

12. The method according to claim 11 in which the first digital word indicates engine speed.

13. The method according to claim 11 in which changes in the second analog signal indicate status of engine components.

14. The method according to claim 11 in which the first and second lines provide signals to respective first and second pens of a strip chart recorder.

15. In a gas turbine engine, a method of obtaining printed data from a digital electronic engine control, which controls fuel delivery to the engine, and which includes a microprocessor, random access memory (RAM), and digital-to-analog convertors (D/A's), all linked by a common digital data bus, comprising the following steps:
    (a) instructing the microprocessor to periodically provide, to a first D/A, a first digital signal derived from a first digital word residing at a first RAM location;
    (b) instructing the microprocessor to periodically provide, to a second D/A, a second digital signal derived from a second digital word residing at a second RAM location;
    (c) transmitting signals from the first and second D/A's to a display located remote from the control; and
    (d) displaying, on the display, a visual representation of the time-history of the first and second digital words.

16. The method according to claim 15 in which the first digital word indicates engine speed.

17. The method according to claim 15 in which the second digital word indicates a failure in an engine component.

18. In a digital control for a gas turbine engine which controls fuel delivery to the engine, and which includes a plurality of digital-to-analog converters (D/A's), the improvement comprising (a) means for connecting one or more D/A's to a recording device located remote from the engine, the recording device being removable without disrupting normal engine operation; and (b) means for causing the control to transmit selected data to the recording device.

* * * * *